United States Patent [19]

Johnson

[11] Patent Number: 4,940,096
[45] Date of Patent: Jul. 10, 1990

[54] THREE POINT HITCH FOR TRUCK

[76] Inventor: Jerry A. Johnson, Rte. 1, Box 217, Devils Lake, N. Dak. 58301

[21] Appl. No.: 405,316

[22] Filed: Sep. 11, 1989

[51] Int. Cl.⁵ ............................................ A01B 59/043
[52] U.S. Cl. .................................... 172/443; 172/450; 172/810; 414/24.5
[58] Field of Search ............................ 414/24.5, 24.6; 172/439, 443, 450, 810

[56] References Cited

U.S. PATENT DOCUMENTS

| 3,078,930 | 2/1963 | Foote | 172/443 |
| 3,310,123 | 3/1967 | Abbott | 172/450 |
| 4,128,179 | 12/1978 | Gilbert | 414/24.5 |
| 4,564,325 | 1/1986 | Ackerman | 414/24.5 |
| 4,674,933 | 6/1987 | Brown | 414/24.6 |

Primary Examiner—Richard J. Johnson
Attorney, Agent, or Firm—Burd, Bartz & Gutenkauf

[57] ABSTRACT

A three point hitch mounted on the rear of a pick up truck has a pair of lift draft arms connected to a hay bale carrier. Pivot connections having upright pivot pins attach the lift draft arms to a transverse shaft allowing the lift draft arms to be folded adjacent each other below the rear bumper of the truck. Crank arms secured to opposite end of the shaft are connected to hydraulic piston and cylinder assemblies. The piston and cylinder assemblies are operable to rotate the shaft to selectively raise and lower the lift draft arms and bale carrier mounted thereon.

23 Claims, 3 Drawing Sheets

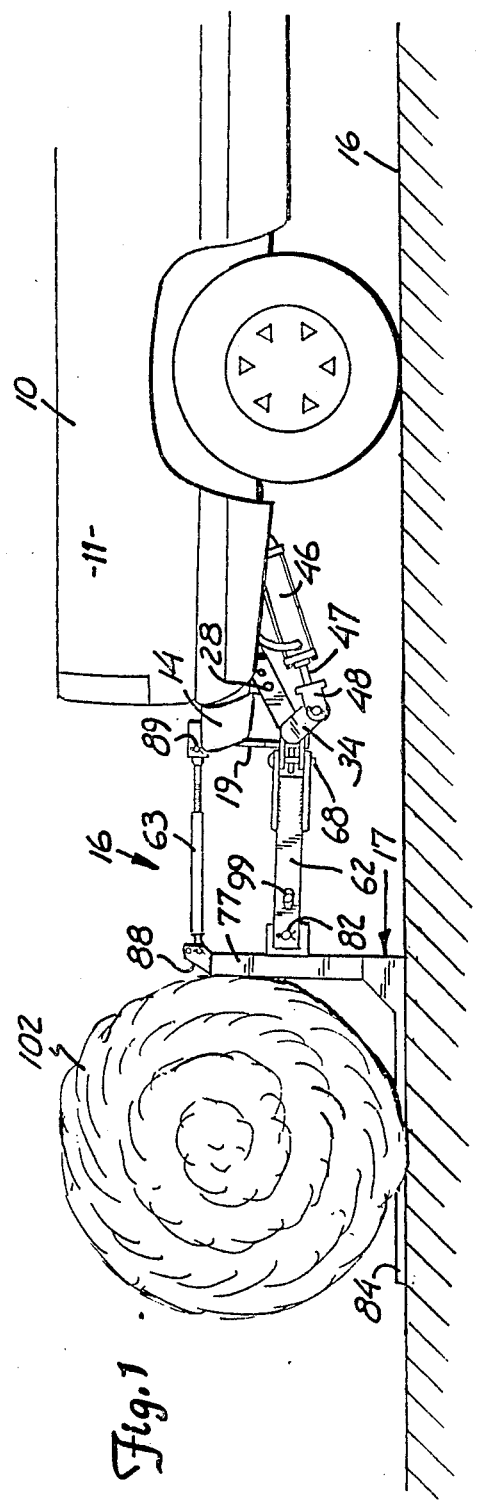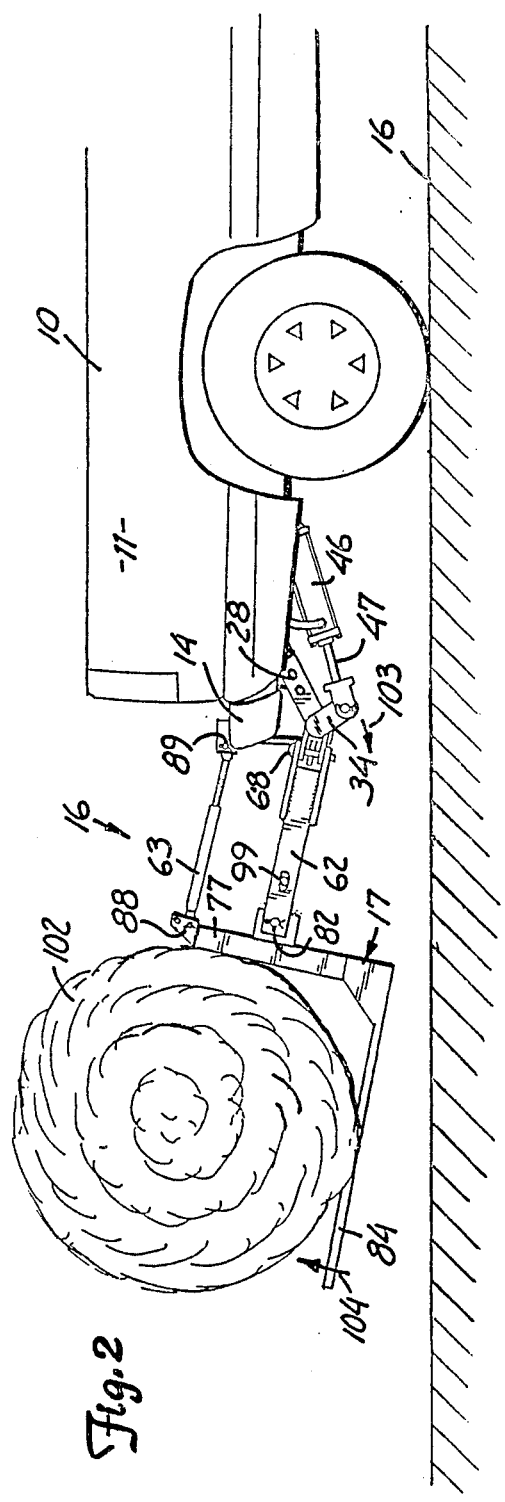

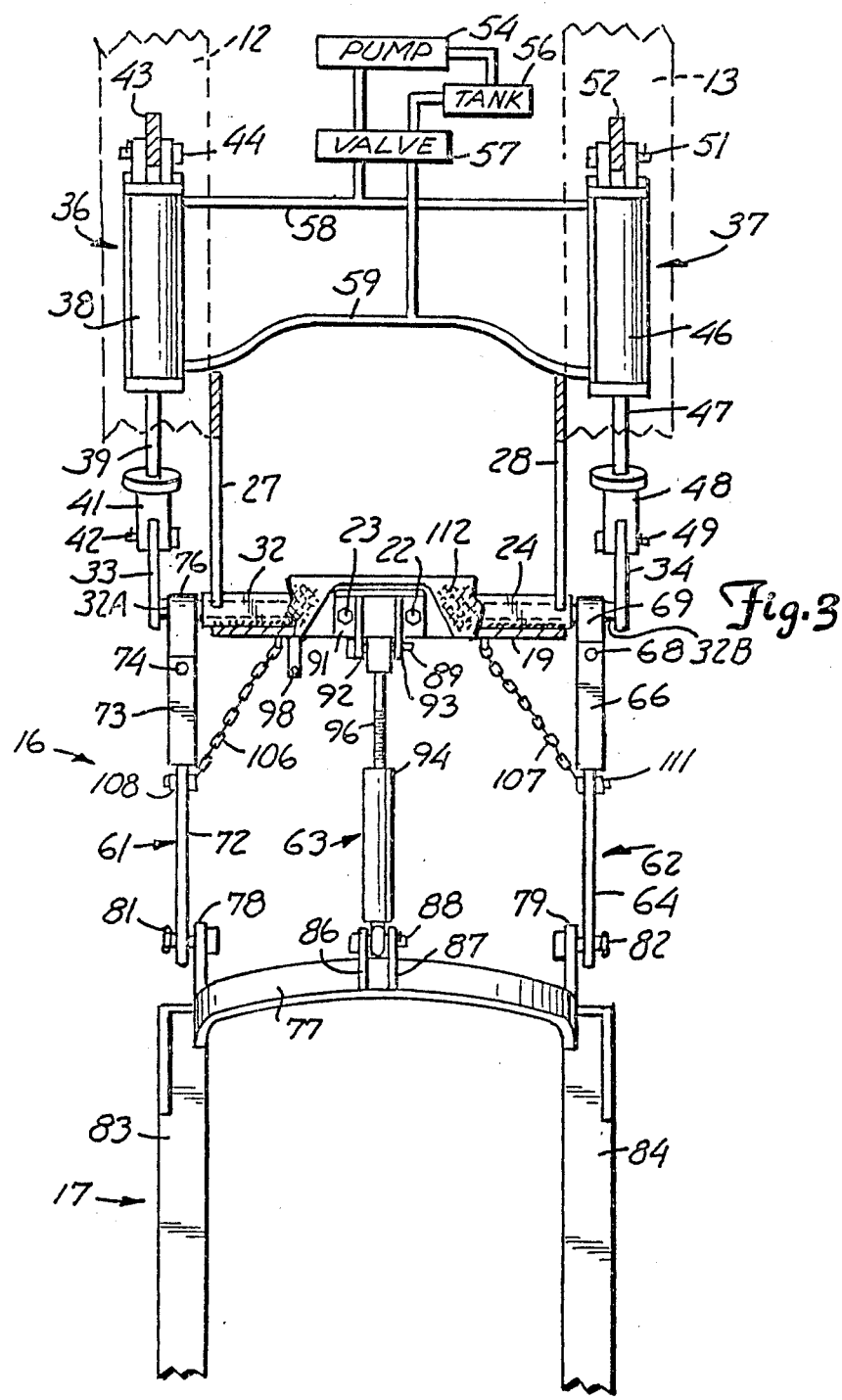

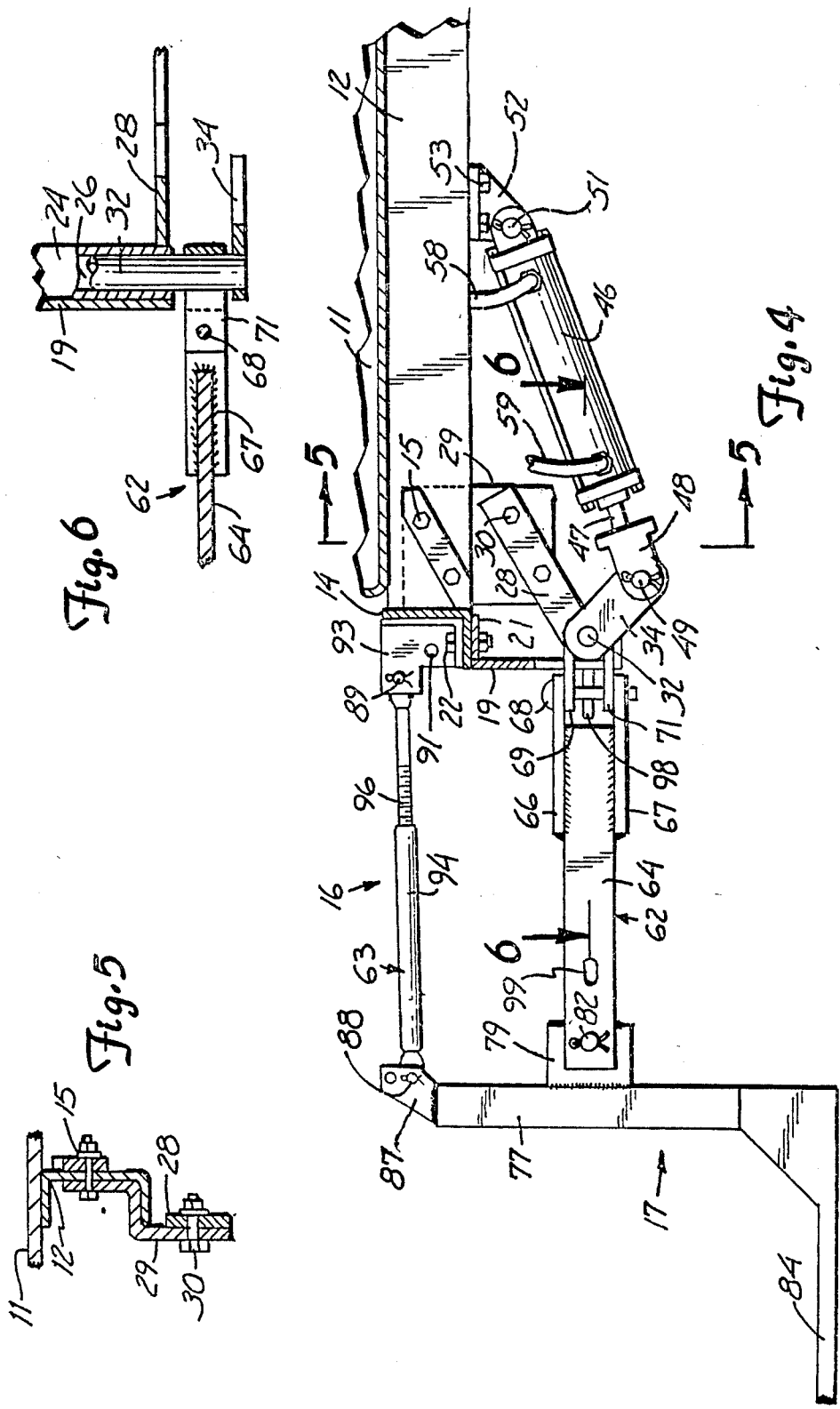

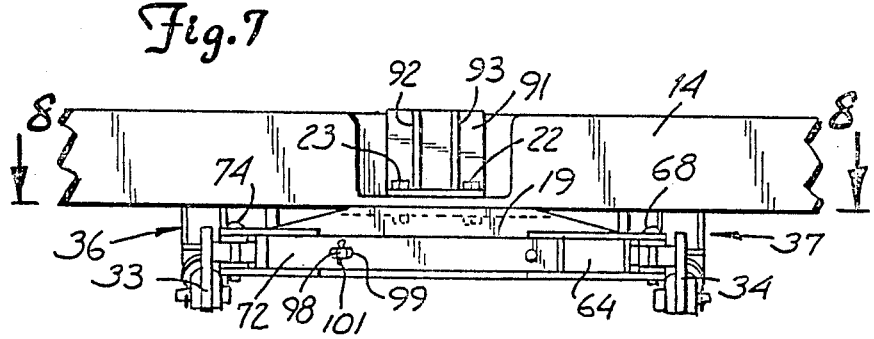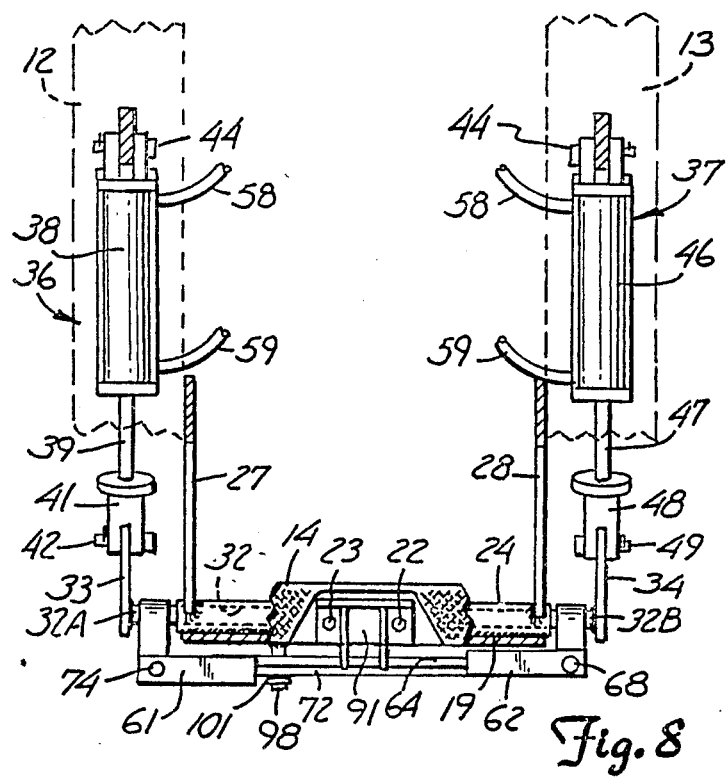

THREE POINT HITCH FOR TRUCK

TECHNICAL FIELD

The invention relates to lifting hitches mountable on pick up trucks for connecting carriers and implements to the truck. The lifting hitch is a hydraulic operated three point hitch mounted on the rear of the frames of a pick up truck.

1. Background of the Invention

Pick up trucks are all purpose motor vehicles extensively used in the agricultural and construction environments for hauling feed, equipment, tools and goods. Hitches connected to the rear frames of the trucks are used to couple trailers and implements to the truck. A number of material handling structures and implements are adapted to be connected to three point hitches mounted on tractors. A three point hitch includes draft arms connected to lift arms to facilitate the raising and lowering of the implements relative to the tractors. Three point hitches is used with tractors are not readily suitable for mounting on a pick up truck. Mounting the three point hitches directly on the rear bumper of a pick up truck places severe stress on the bumper supports. The hitch also projects rearwardly of the bumper so that it must be removed for highway travel.

2. Summary of the Invention

The invention is directed to a three point hitch mountable on the frames of a pick up truck below the rear bumper of the truck. The hitch has a transverse base plate located below the bumper. Supports connect the base plate to the frames of the truck. A transvers tube secured to the base plate carries a transverse rotatable shaft. The shaft has opposite ends connected to lift draft arms and crank arms. Separate linear actuators, such as the piston and cylinder assemblies, are connected to the crank arms and the frame members. The piston and cylinder assemblies are supplied with fluid under pressure from a pump. The control valve is used to direct the flow of hydraulic fluid under pressure to and from the cylinder assemblies thereby selectively raise or lower the lift draft arms. A control link is pivotally connected to a bracket mounted on the bumper and a carrier, such as a fork bale carrier. The lift draft arms are pivotally connected to opposite portions of the carrier so that the carrier is selectively raised and lowered in response to the raising and lowering movements of the lift draft arms.

The separate upright pivotal connections couple the lift draft arms to opposite ends of the shaft. The pivotal connections allow the arms to be folded adjacent each other below the bumper to store the lift draft arms in a position that does not interfere with the bumper nor project any substantial distance rearwardly of the bumper. The folded lift draft arms are retained in the folded position with a releasable connector.

The three point hitch of the invention will enable not only farmers and ranchers but any individual more use out of their pickup trucks for many basic chores such as blading and leveling roads, cultivating, discing, plowing and row crop equipment, pulling tractor equipment, picking up and transporting spray tanks, picking up and transporting large round hay bales for feeding purposes or organizing bales in feed lots or fields. An individual will be able to hook up snow blowers to the back end of their pick up truck, change tires without the use of a jack, pull trenchers, roll fence wire up and out, put fence posts in or pull them out, pull boat docks in and out of the water, or use it for log splitting. The individual will also have extra weight on the back end of the pick up truck giving the rear drive wheels more traction for pulling.

Farmers and ranchers now have to use tractors with three point hitches for many chores. Many farmers have had to purchase additional tractors to take care of the different work that the three point hitch will take care of. For example: when a farmer needs to feed his cattle in the winter in cold climates, he must first go out and try to get his tractor started after being plugged in all night. When it does start, he must let it run and warm up 10-15 minutes. Then he must drive out to the hay and try to pick up a hay bale with the special loader he had to purchase just for this chore of moving hay bales. A farmer will be able to use small equipment without having to use a tractor. There will be no need to go out and warm up a tractor to move feed out to the animals. The farmer will not have to sit in a noisy, cold tractor—but will instead be able to use a comfortable, warm, clean, quiet pickup to do many chores that now need to be done on the tractor.

The three point hitch of the invention can be mounted onto any standard size pick up or larger truck, such as a one ton or even larger truck. It will allow an individual hook up to any three point hitch equipment. It takes only seven bolts and two pins to mount it onto a pick up truck. The hitch does not have to be removed since it folds under the pick up truck rear bumper. The three point hitch is a faster, safer, and easier method of hook up of an implement for doing many basic chores which now require the use of a tractor.

Additional objects in advantages of the three point hitch mounted on the rear of a pick up truck are embodied in the following detailed description of a preferred embodiment of the invention and accompanying drawing.

DESCRIPTION OF DRAWING

FIG. 1 is a side view of the rear of a pick up truck and the three-point hitch of the invention connected to a bale carrier located in the bale pick up position;

FIG. 2 is a view similar to FIG. 1 showing the position of the three point hitch and bale carrier in the bale transport position;

FIG. 3 is a fragmentary top plan view of the three point hitch and bale carrier of FIG. 1;

FIG. 4 is an enlarged side elevational view, partly sectioned, of the three point hitch and bale carrier of FIG. 3;

FIG. 5 is a sectional view taken along the line 5—5 of FIG. 4;

FIG. 6 is a sectional view taken along line 6—6 of FIG. 4;

FIG. 7 is a rear elevational view of the folded three point hitch located below the bumper of the pick up truck; and FIG. 8 is a sectional view taken along the line 8—8 of FIG. 7.

DESCRIPTION OF PREFERRED EMBODIMENT

Referring to FIGS. 1 and 2, there is shown the rear of a motor vehicle, such as a pick up truck 10 having an open top box 11. Box 11 is mounted on a pair of rearwardly directed generally horizontal frames 12 and 13, as shown in broken lines in FIG. 3. Frames 12 and 13 are conventional longitudinal box beams or channel beams of truck 10. A transverse rear bumper 14 is secured to the rear end portions of frames 12 and 13. Truck 10 is illustrative of a type of vehicle useable with the three point hitch of the invention indicated generally 16 in FIGS. 1 to 4 of the invention. Other types of vehicles and trailers can be equipped with three point hitch 16.

A hay bale carrier or fork assembly indicated generally at 17 is connected to hitch 16. Other types of product carriers, buckets, and blades can be connected to hitch 16 and used to transport products and scrap gravel, snow, ice, dirt, manure, and the like from ground surface 18, a floor, and like surfaces.

Referring to FIGS. 3 and 4, hitch 16 has a transverse base plate or frame 19 having a forwardly directed horizontal lip 21. A plurality of bolts 22 and 23 secured lip 21 to a center portion of bumper 14. A transverse tube 24 having a transverse passage 26 is secured by welds or the like to frame 19. A pair of forwardly directed support arms 27 and 28 are secured to opposite ends of tube 24. The forward ends of arms 27 and 28 are located adjacent the bottom of the rear portions of vehicle frames 12 and 13. As shown in FIGS. 4 and 5, a bracket 29 is secured to frame 12 with bolts 15. A pair of bolts 30 connect support arm 28 to bracket 29. A similar bracket (not shown) connects support arm 27 to frame 12. Support arms 27 and 28 function as gussets that maintain the transverse position of base plate 19 below bumper 14 and resist twisting and bending of base plate 19. Other types of fasteners and brackets can be used to secure arms 27 and 28 to vehicle frames 12 and 13.

As shown in FIG. 3, opposite ends 32A and 32B of shaft 32 project outwardly from the ends of tube 24 and are secured to downwardly directed crank arms 33 and 34 respectively. Arms 33 and 34 are connected to linear actuators, illustrated generally at 36 and 37 as double acting hydraulic fluid cylinder assemblies. Cylinder assembly 36 has a cylinder 38 accommodating an elongated piston rod 39. A connector 41 joined to the outer end of piston rod 38 is pivotally connected with a pin 42 to the lower end of crank arm 33. Cylinder 38 is pivotally connected with a pin 44 to a bracket 43 secured to the lower side of vehicle frame 12 with bolts (not shown). Cylinder assembly 37 is a double acting cylinder 46 accommodating a linear piston rod 47. The outer end of piston rod 47 is joined to a connector 48 pivotally connected with pin 49 to lower end of crank arm 44. The upper end of cylinder 46 is connected with a pin 51 to a bracket 52 secured with a plurality of bolts 53 to vehicle frame 13. An identical bracket 43 is used to connect cylinder 38 to frame 12.

Returning to FIG. 3, cylinder assemblies 36 and 37 are supplied with hydraulic fluid under pressure from a pump 54 connected to a tank 56 and valve 57. Pump operates to draw hydraulic fluid from tank 56 and deliver the fluid to valve 57 which is connected with lines 58 and 59 to opposite ends of hydraulic cylinders 38 and 46 whereby the operator of the vehicle can selectively expand in or contract the cylinder assemblies 36 and 37. Pump 54 can be driven by the motor of the vehicle or a separate electric motor. The valve 57 can be a hand operated spool valve located in the cab of the vehicle to provide convienent access to the operator of the vehicle. Valve 57 can be a solenoid operated valve controlled with electric switches by the operator of the vehicle.

The three point hitch 16 has a pair of rearwardly directed draft arms indicated generally at 61 and 62 secured to opposite ends of shaft 32 adjacent crank arms 33 and 34. A control link indicated generally at 63 is located between draft arms 61 and 62. Referring to FIGS. 3 and 4, draft arm 62 has an elongated flat plate 64 connected at its inner end to upper and lower members 66 and 67. An upright pin 68 pivotally connects members 66 and 67 to hinge arms 69 and 71 secured to shaft 32 whereby draft arm 62 angularly moves upon rotation of shaft 32. Draft arm 61 has identical structure to arm 62 including an elongated linear plate 72 joined to members 73 and 74 accomodating a generally upright pin 74. Pin 74 is connected to arms 76 secured to shaft 32 whereby draft arms 61 can swing about a generally upright axis.(2)

Bale carrier 71 has an inverted generally U-shape frame 77 carrying rearwardly directed ears 78 and 79. Horizontally aligned pins 81 and 82 joined to ears 78 and 79 are pivotally connected to the outer ends of draft arm members 64 and 72 respectively whereby bale carrier 17 pivots about the common horizontal transverse axis of aligned pins 81 and 82. Control link 63 is pivotally connected to a pair of upright tabs 86 and 87 with a pin 88. The inner end of control link 63 is pivotally connected with a pin 89 to a bracket 91 secured to the center of bumper 11 with bolts 22 and 23. Bracket 91 has upright laterally spaced ears 92 and 93 with aligned holes that accommodate pin 89 that is pivotally connected to the inner end of control link 63. Control link 63 has a tubular member 94 accommodating a threaded rod 96 which allows for linear adjustment of the length of control link 63 to level bale carrier 71 in the pick up position shown in FIG. 1.

As shown in FIG. 3, lift draft arms 61 and 62 extend rearwardly from the upwardly directed pivot pins 74 and 68 respectively. The outer ends of the arms 61 and 62 are pivotally connected to the pins 81 and 82 of the bale carrier 17. Arms 61 and 62 are generally parallel to each other. Flexible links such as chains 106 and 107 connected to transverse base plate 19 and arms 61 and 62 limit outward swinging movement of the arms. A connector 108 secures chain 106 to plate 72. In similar manner a connector 111 secures chain 107 to plate 64. Other structures can be used to attach the limit chains 106 and 107 to arms 61 and 62.

Referring to FIGS. 7 and 8, lift draft arms 61 and 62 are shown as folded together in the transport position below bumper 14. A rearwardly direct stud 98 is secured to transverse base plate 19. The plates 64 and 72 have elongated slots 99 that accommodate stud 98 when lift draft arms 61 and 62 are in their folded positions. A releasible lock or pin 101 associated with stud 98 retains the plates 64 and 72 in side by side positions as shown in FIGS. 8. Other locking structures can be used to retain the lift draft arms 61 and 62 in their folded transport position under bumper 14.

In use, fork assembly 17 is used to pick up and transport a large round hay bale 102 as shown in FIGS. 1 and 2. The three point hitch 16 is initially lowered to place the forks 83 and 84 of bale carrier 17 on the ground 16. The pick up truck 10 is then backed into bale 2 locating forks 83 and 84 under the bale 102. The bale 102 is moved upward direction as indicated by arrow 104 in FIG. 2 to a transport position. The hydraulic piston and cylinder assemblies are extended thereby moving the crank arms 33 and 34 in a clockwise direction causing the lift and draft arms 61 and 62 to swing upwardly. The piston and cylinder assemblies as well as the crank arms 33 and 34 do not go below the normal horizontal plane of the rear differential of the pick up truck whereby there is substantial clearance between the three point hitch and the surface of the ground. The pick up truck 10 is used to transport the hay bale 102 to desired location such as a feed lot. The hydraulic piston and cylinder assemblies 36 and 37 are then retracted to lower the bale carrier 17 to the ground. The pick up truck 10 is then moved forward to separate the bale carrier 17 from the bale 102. The piston and cylinder assemblies are then extended to raise the bale carrier 17 to a transport position so that the pick up truck can be driven to a location to pick up and transport a subsequent round hay bale.

The three point hitch 16 has been shown as connected to a bale carrier 17. Other types of fork lift structures can be connected to hitch 16. Rear scrapper blade implements and other equipment adaptable to three point hitches.

While there have been shown and described a preferred embodiment of the three point hitch of the invention mounted on the rear frames of a pick up truck, it is understood that changes, modifications, and arrangements of structure as well as parts can be made by those skilled in the art without departing from the invention. The invention is defined in the following claims.

I claim:

1. A hitch for a truck having a pair of longitudinally extended frame members, said frame members having rear ends, a transverse rear bumper secured to the rear ends of the frame members, comprising: a first support connected to one frame members, comprising: a first support connected to one frame member, a second support connected to the other frame member, a transverse base plate secured to said first and second supports, means connecting the base plate to the rear bumper, a transverse tube means located below said bumper secured to said base plate, shaft means rotatable mounted on and extended through said tube means, said shaft means having opposite ends, a first lift draft arm, a second lift draft arm, first upright pivot means connecting the first lift draft arm to one end of the shaft means, second upright pivot means connecting the second lift draft arm to the other end of the shaft means, said first and second lift draft arms being movable from rearward extended positions to folded positions below said bumper whereby said first and second lift draft arms can be folded adjacent each other below said bumper, means for holding the first and second lift draft arms folded adjacent each other, means limiting the rearward extended positions of the first and second lift draft arms, a first crank arm secured to one end of the shaft means, a second crank arm secured to the other end of the shaft means, a first piston and cylinder assembly connected to the first crank arm, a second piston and cylinder assembly connected to the second crank arm, means connecting the first piston and cylinder assemblies to the frame members, and means for supplying fluid under pressure to the first and second piston assemblies whereby the first and second piston assemblies operate to rotate the shaft means to selectively raise and lower the first and second lift draft arms.

2. The hitch of claim 1 wherein: the first piston and cylinder assembly is located generally below one frame member, and the second piston and cylinder assembly is located generally below the other frame member.

3. The hitch of claim 1 wherein: each piston and cylinder assembly includes a cylinder connected to a frame member, a movable piston located within the cylinder, and piston rod connected to the piston and a crank arm.

4. The hitch of claim 1 wherein: each of said pivot means includes an upper member and a lower member secured to the shaft means, and an upright pin extended through said upper and lower members and portions of the lift draft arm to pivotally connect the lift draft arm to said upper and lower members.

5. The hitch of claim 1 including: a control link, and upright means secured to the bumper adopted to be secured to said control link.

6. The hitch of claim 1 wherein: the transverse base plate has a generally horizontal transverse top lip and a transverse body joined to the lip and extended downwardly therefrom, said transverse tube being secured to said body.

7. The hitch of claim 1 including: a means associated with the first and second lift draft arms for connection to a device for lifting and transporting an object.

8. The hitch of claim 1 wherein: said means for holding the first and second lift draft arms folded adjacent to each other includes a stud secured to the transfers base plate, said first and second lift draft arms having holes accommodating said stud, and means releasibly connected to said stud for holding the first and second lift draft arms on said stud.

9. A hitch for a vehicle having longitudinally extended frame members, said frame members having rear sections, a transverse rear bumper secured to the rear sections of the frame members, comprising: support means connected to the frame members a transverse shaft means having opposite ends, means rotatably mounting the transverse shaft means on said support means, a first lift draft arm, a second lift draft arm, first upright pivot means connecting the first lift draft arm to one end of the shaft means, second upright pivot means connecting the second lift arm to the other end of the shaft means, said first and second lift draft arms being movable from rearward extended positions to folded positions below said bumper whereby said first and second lift draft means can be folded adjacent each other below said bumper, means for holding the first and second lift draft means folded adjacent each other, crank arm means secured to said shaft means, piston and cylinder means connected to said crank arm means and at least one of said frame members, and means for supplying fluid under pressure to the piston and cylinder means whereby said piston and cylinder means operate to rotate the shaft means to selectively raise and lower the first and second lift draft arms.

10. The hitch of claim 9 wherein: each of said pivot means includes an upper member and a lower member secured to the shaft means, and an upright pin extended through said upper and lower members and portions of the lift draft arm to pivotally connect the lift draft arm to said upper and lower members.

11. The hitch of claim 9 including: a control link, an upright means secured to the bumper adapted to be secured to said control link.

12. The hitch of claim 9 wherein: the support means includes a transverse base plate, said means rotatably mounting the shaft means being secured to said base plate.

13. The hitch of claim 12 wherein: the means secured to said base plate comprises an elongated continuous transverse tube, said shaft means being rotatably mounted on and extended through said transverse tube.

14. The hitch of claim 9 wherein: said means for holding the first and second lift draft arms folded adjacent to each other includes a stud secured to said support means, said first and second lift draft arms having holes accommodating said stud, and means releasibly connected to said stud for holding the first and second lift draft arms on said stud.

15. A hitch for a truck including longitudinally extended frame means having a rear end portion, a transverse rear bumper secured to the rear end portion of the frame means, comprising: support means connected to the frame means, transverse tube means located below said bumper secured to the support means, shaft means rotatably mounted on and extended through said tube means, said shaft means having opposite ends, a first lift draft arm, a second lift draft arm, said first and second lift draft arms being movable from rearward extended positions to folded positions below said bumper, first upright pivot means connecting the first lift draft arm to one end of the shaft means, second upright pivot means connecting the second lift draft arm to the other end of the shaft means whereby said first and second lift draft arms can be folded adjacent each other below said bumper, means for holding the first and second lift draft arms folded adjacent each other, means limiting the rearward extended positions of the first and second lift arms, crank arm means secured to the shaft means, extendible and contractable means secured to the crank arm means and frame means, and means for operating the extendible and contractable means to rotate the shaft means to selectively raise and lower the first and second lift arms.

16. The hitch of claim 15 wherein: said extendible and contractable means includes piston and cylinder means, said means for operating the extendible and contractible means including means for supplying fluid under pressure to said piston and cylinder means and allowing fluid to flow from said piston and cylinder means.

17. The hitch of claim 16 wherein: said piston and cylinder means comprises a pair of piston and cylinder assemblies connected to the crank arm means.

18. The hitch of claim 17 wherein: said crank arm means comprises a first crank arm secured to one end of the shaft means and one piston and cylinder assembly, and a second crank arm secured to the other end of the shaft means and the other piston and cylinder assembly.

19. The hitch of claim 15 wherein: each of said pivot means includes an upper member and a lower member secured to the shaft means, and an upright pin extended through said upper and lower members and poritions of the lift draft arm to pivotally connect the lift draft arm to said upper and lower members.

20. The hitch of claim 15 including: a control link, and upright means secured to the bumper adopted to be secured to said control link.

21. The hitch of claim 15 wherein: said support means includes a transverse body: said transverse tube means being secured to said transverse body below said bumper.

22. The hitch of claim 21 including: means securing said transverse body to said bumper.

23. The hitch of claim 15 wherein: said means for holding the first and second lift draft arms folded adjacent each other include stud means secured to said support means, said first and second lift draft arms having holes accommodating the stud means, and means releasibly connected to the stud means for retaining the first and second lift draft arms on said stud means.

* * * * *